United States Patent
Yoshida

(10) Patent No.: US 8,079,234 B2
(45) Date of Patent: Dec. 20, 2011

(54) MANUFACTURING APPARATUS FOR POROUS GLASS BASE MATERIAL

(75) Inventor: Makoto Yoshida, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 594 days.

(21) Appl. No.: 11/984,840

(22) Filed: Nov. 21, 2007

(65) Prior Publication Data

US 2008/0148781 A1 Jun. 26, 2008

(30) Foreign Application Priority Data

Nov. 22, 2006 (JP) .................................. 2006-316025

(51) Int. Cl.
*C03B 8/04* (2006.01)
*C03B 37/018* (2006.01)
(52) U.S. Cl. ............................... 65/532; 65/503; 65/530
(58) Field of Classification Search ..................... 65/530, 65/532
See application file for complete search history.

(56) References Cited

U.S. PATENT DOCUMENTS

| 6,619,074 B1 | 9/2003 | Wada et al. |
| 2002/0194879 A1 | 12/2002 | Takei |
| 2004/0079119 A1 | 4/2004 | Fukutani |
| 2007/0209397 A1 | 9/2007 | Otosaka |

FOREIGN PATENT DOCUMENTS

| JP | 05-306136 | 11/1993 |
| JP | 10-72229 | 3/1998 |
| JP | 11-313135 | 11/1999 |
| WO | WO 2005/092803 A1 | 10/2005 |

OTHER PUBLICATIONS

European Search Report dated Mar. 6, 2008.
Chinese Office Action dated Mar. 2, 2011 (with English translation).

*Primary Examiner* — Matthew Daniels
*Assistant Examiner* — Cynthia Szewczyk
(74) *Attorney, Agent, or Firm* — McGinn IP Law Group, PLLC

(57) ABSTRACT

Provided is a manufacturing apparatus for manufacturing a porous glass base material by depositing glass particles, which has a chamber having air inlets, and an air distribution container having air outlets from which clean air is supplied to the air inlets.

15 Claims, 5 Drawing Sheets

MANUFACTURING APPARATUS FOR POROUS GLASS BASE MATERIAL

CROSS REFERENCE TO RELATED APPLICATION

The present application claims priority from a Japanese Patent Application No. 2006-316025 filed on Nov. 22, 2006, the contents of which are incorporated herein by reference.

BACKGROUND

1. Technical Field

The present invention relates to a manufacturing apparatus for a porous glass base material. Particularly, the present invention relates to a manufacturing apparatus for manufacturing a porous glass base material which allows few air bubbles or foreign materials to mix thereinto at the step of transparent vitrification, even when manufacturing a large-sized porous glass base material.

2. Related Art

VAD is a well-known method as a manufacturing method for an optical fiber base material. According to this method, a starting member is attached to a shaft which can rotatably lift up, and lifted down on this shaft into a chamber, so that glass particles generated by a core deposition burner and a clad deposition burner provided inside the chamber are deposited on the tip of the starting member and a porous glass base material (hereinafter referred to simply as porous base material) made of a core layer and a clad layer is thus manufactured.

Since the efficiency in the generated glass particles getting deposited cannot be 100%, un-deposited un-landed extra glass particles occur throughout the manufacturing process. The majority of the extra glass particles are discharged to the outside of the chamber through an exhaust outlet together with other gas such as exhaust gas.

However, some of the glass particles adhere to the ceiling or side walls of the chamber after the particles are generated by the burners until they are discharged. The glass particles attached on the inner walls of the chamber come off, fall, fly around in the chamber and adhere to a porous base material being manufactured, to be a cause of air bubbles or foreign materials mixing into the optical fiber base material when the material is subjected to transparent vitrification.

Recently, reduction in the manufacturing cost is demanded, and enlargement of optical fiber base materials is sought after. As the size of the optical fiber base materials increases, the amount of materials to be input increases, leading to the increase in the absolute amount of un-deposited glass particles even without any change in the efficiency of deposition. Thus, increase in the frequency of glass particles attached on the inner walls of the chamber coming off and falling cannot be avoided.

To solve this problem, there is proposed a method of actively introducing air into the chamber to regulate the air current in the chamber so that the extra glass particles are carried away on the regulated current and discharged to the outside of the chamber.

According to Unexamined Japanese Patent Application Publication No. 2000-109328, filters are attached on air inlets on both sides of the burners and clean air is forcibly introduced from these air inlets into the chamber to make a regulated air current.

According to Unexamined Japanese Patent Application Publication No. 2004-161506, air from a blower is supplied into the anterior chamber of the chamber and let through a filter provided inside the chamber, and the obtained clean air is supplied into the posterior chamber of the chamber to generate a regulated air current.

SUMMARY

However, since these methods use filters near the burners, the filters severely deteriorate due to heat, and their portions fly as particles inside the chamber and give rise to the problem of foreign materials mixing into the optical fiber base material in the transparent vitrification process. Furthermore, there is a problem that the extra glass particles inside the chamber adhere to the filters and again fly and generate air bubbles.

Hence, the object of the present invention is to provide a manufacturing apparatus for manufacturing a porous base material by VAD, which can manufacture even a large-sized porous base material to be a porous base material including few air bubbles or foreign materials.

According to one aspect of the innovation included herein, an object is to provide a manufacturing apparatus for a porous glass base material which can solve the above-described problems. The above and other objects can be achieved by combinations described in the independent claims. The dependent claims define further advantageous and exemplary combinations of the present invention.

That is, according to one exemplary manufacturing apparatus for a porous glass base material according to an aspect relating to the innovation included herein, there is provided a manufacturing apparatus for manufacturing a porous glass base material by depositing glass particles, which has: a chamber having air inlets; and an air distribution container having air outlets from which clean air is supplied to the air inlets.

The air distribution container may have a projecting structure formed of a plurality of surfaces which are formed according to the shape of the air inlets, and distribute the clean air supplied from the duct toward the air outlets by making the clean air collide against the projecting structure. The chamber and the air distribution container may be structured so as to be detachable from each other by means of a sliding rail and a roller.

The air distribution container may be attached on the chamber via a sealing packing, which is provided between the air outlets and the air inlets of the chamber. The air distribution container may be attached on the chamber via a resistance imparting member, which is provided between the air outlets and the air inlets of the chamber.

The resistance imparting member may have a mesh structure. The manufacturing apparatus may adjust the amount of air to be supplied to each of the air inlets by selecting coarseness of the mesh of the resistance imparting member.

The resistance imparting member may have a punched structure formed by punching. The manufacturing apparatus may adjust the amount of air to be supplied to each of the air inlets by selecting the interval between and the size of punched openings of the punched structure of the resistance imparting member.

The above summary of the invention is not intended to list all the necessary features of the present invention, but subcombinations of these features can also provide an invention.

BRIEF DESCRIPTION OF THE DRAWINGS

FIG. 3 is a schematic transparent diagram showing the inside of the air distribution container as seen through.

DESCRIPTION OF EXEMPLARY EMBODIMENTS

One aspect of the present invention will be explained below through an embodiment of the invention, but the embodiment below is not intended to limit the invention set forth in the claims, or all the combinations of the features explained in the embodiment are not necessarily essential to the means of solving provided by the invention.

Figure 1:
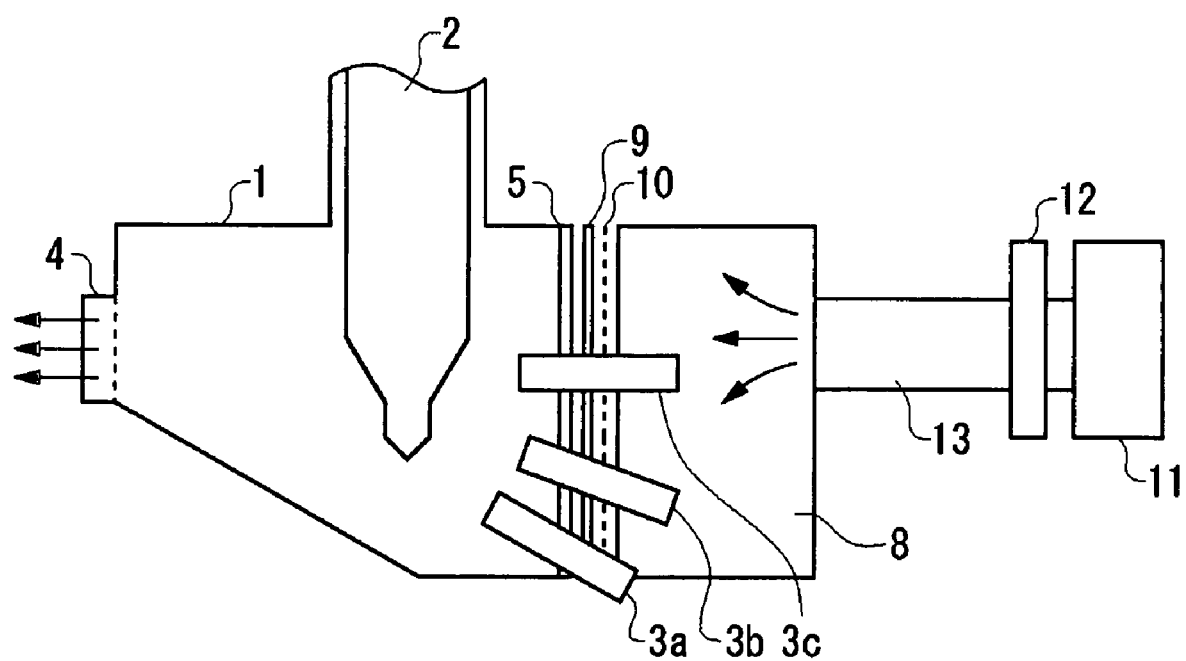
FIG. 1 is a vertical cross sectional diagram showing a schematic view of a manufacturing apparatus according to the present invention.
Figure 2:
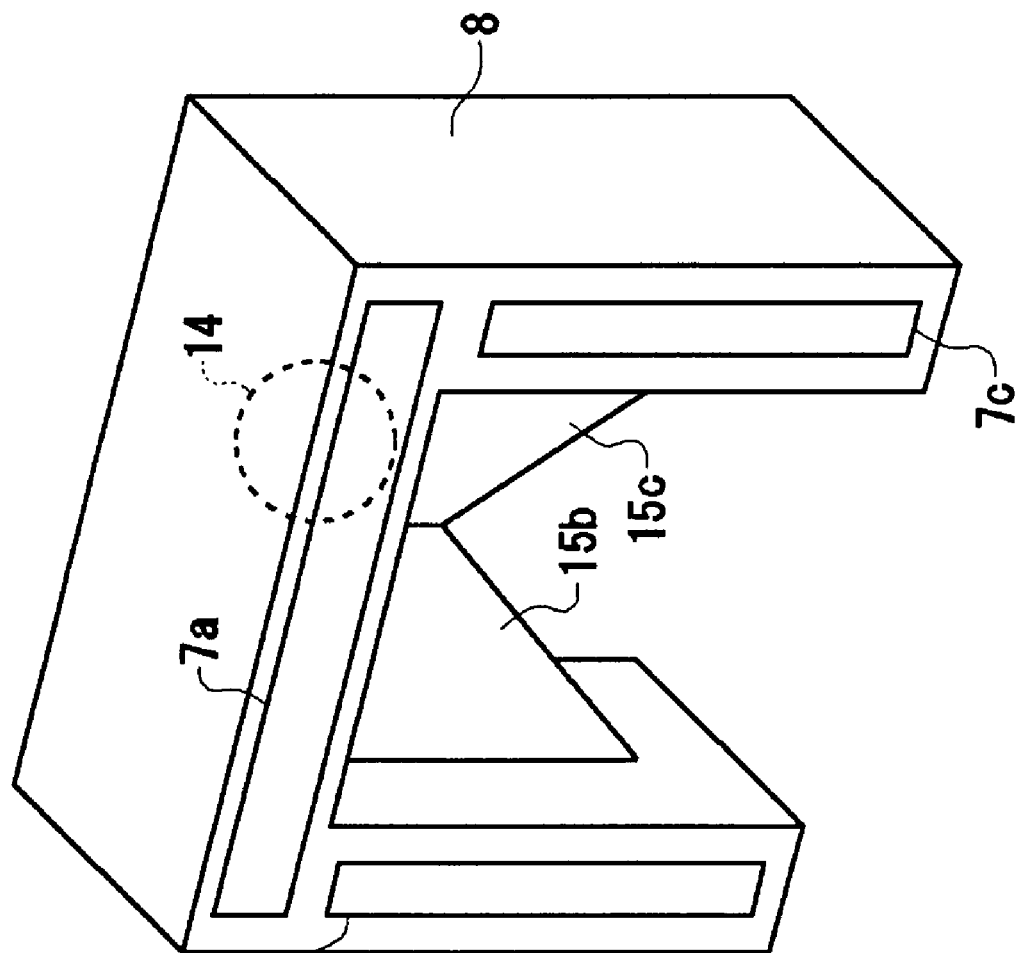
FIG. 2 is a perspective diagram showing schematic views of air inlets formed in the rear wall of a chamber and air outlets formed in an air distribution container.
Figure 3:
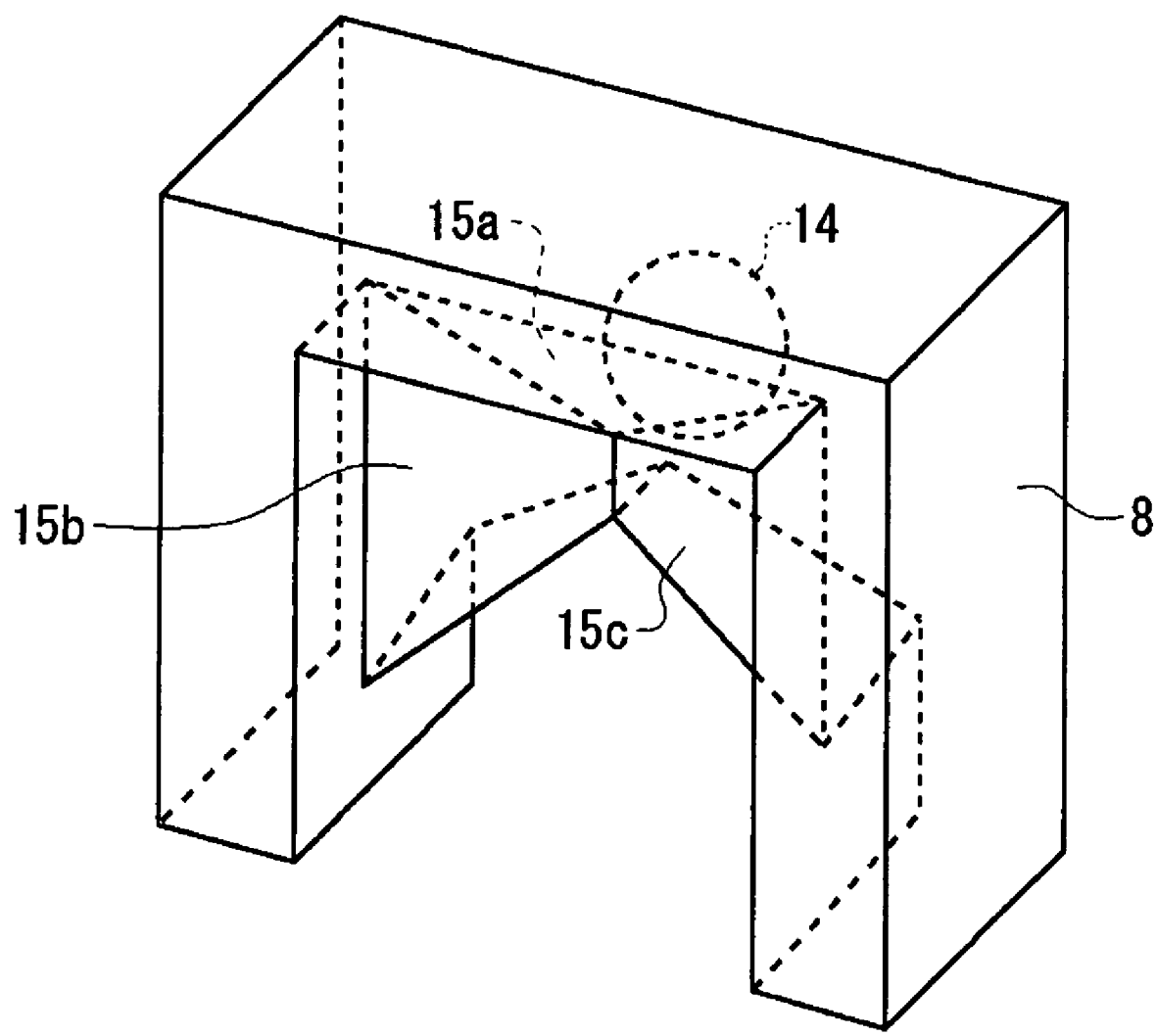
Figure 4:
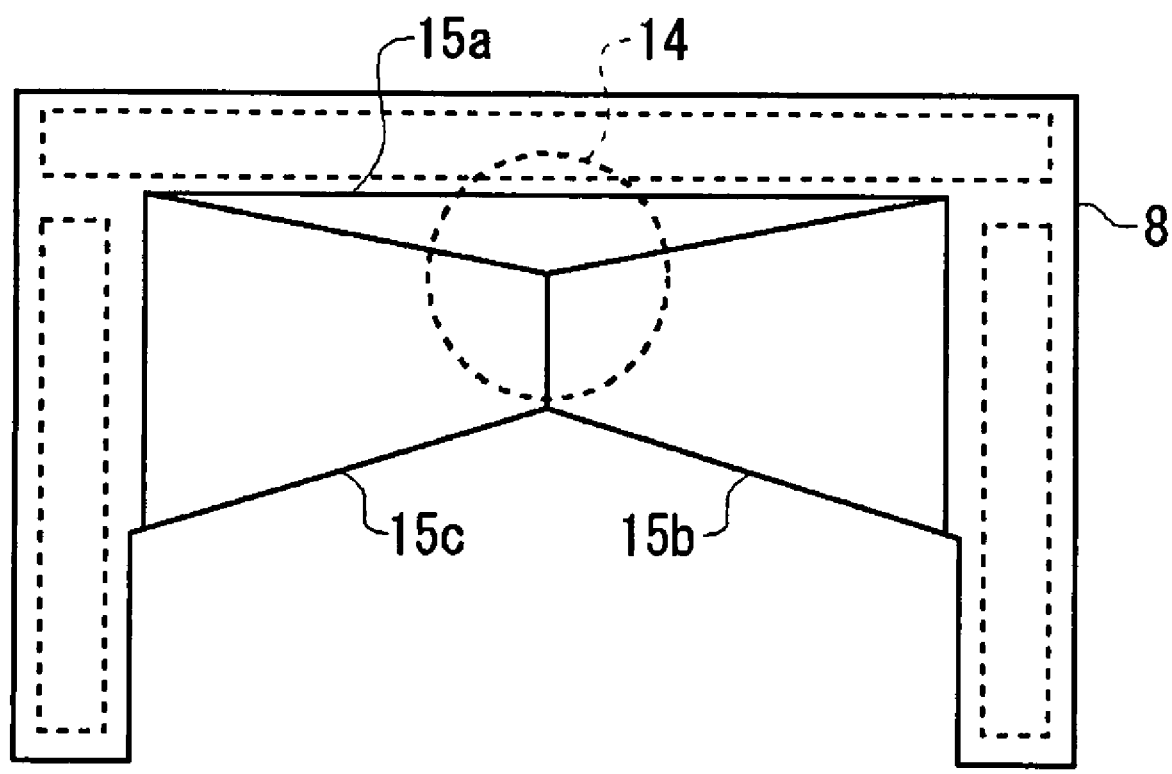
FIG. 4 is a schematic diagram showing a projecting structure formed of three panels provided inside.
Figure 5:
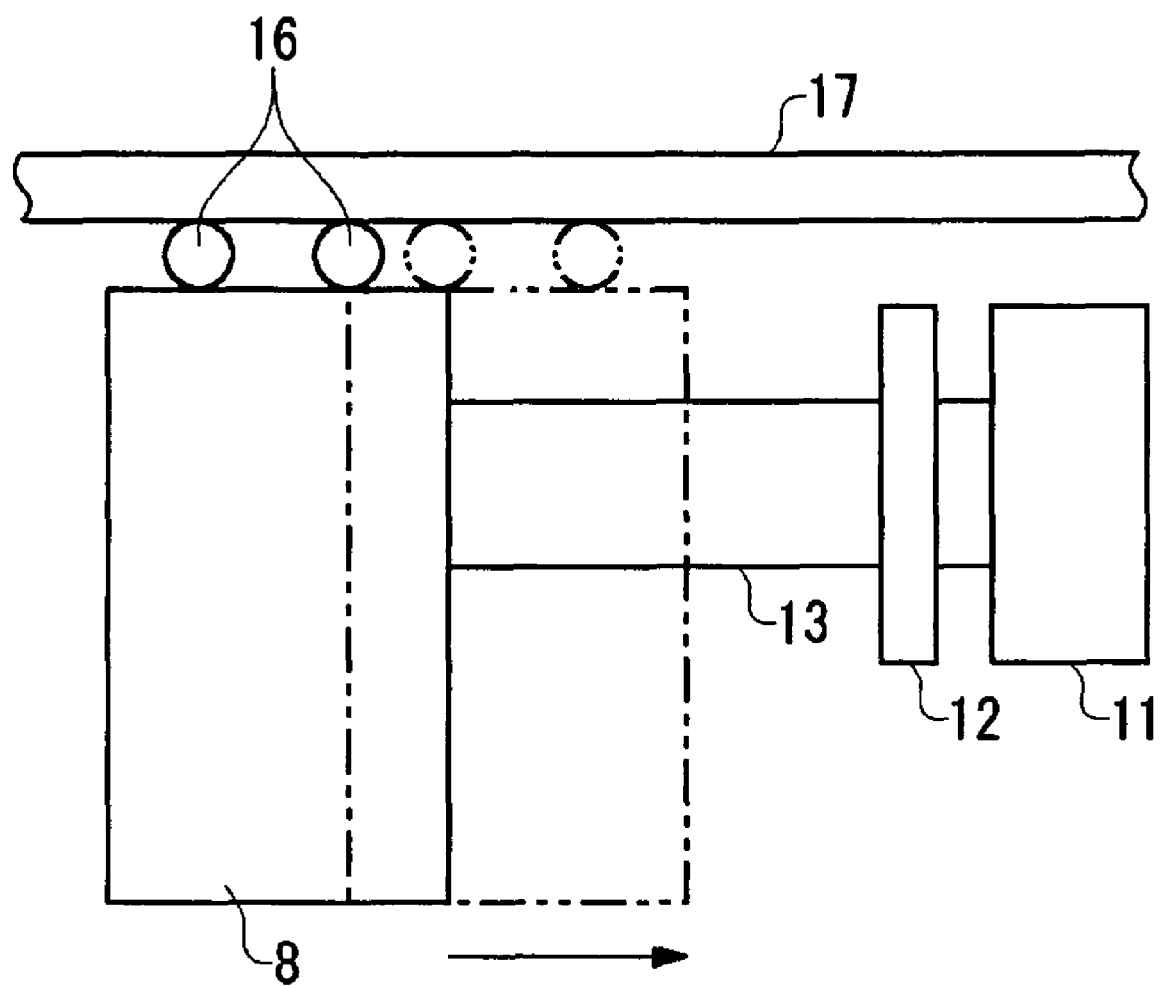
FIG. 5 is a schematic diagram for explaining a mechanism to advance and retreat the air distribution container.

FIG. 1 is a vertical cross sectional diagram showing a schematic view of a manufacturing apparatus according to the present invention and FIG. 2 is a perspective diagram showing schematic views of air inlets formed in the rear wall of a chamber and air outlets formed in an air distribution container. FIG. 3 is a schematic transparent diagram showing the inside of the air distribution container as seen through, and FIG. 4 is a schematic diagram showing a projecting structure formed of three panels provided inside. FIG. 5 shows a mechanism which allows the air distribution container to be detached from the chamber.

In the chamber 1, this apparatus has an exhaust outlet 4 in its wall facing burners 3a to 3c via a porous base material 2, and has, in its rear wall 5, an air inlet 6a above the burners and air inlets 6b and 6c on both sides of the burners. An air distribution container 8, which has air outlets 7a to 7c having the same shape as that of the air inlets 6a to 6c of the chamber 1 as shown in the perspective diagram of FIG. 2, is attached to the air inlets 6a to 6c via a sealing packing 9 and a resistance imparting member 10, in a manner that the air outlets 7a to 7c face the air inlets 6a to 6c. As the resistance imparting member 10, for example, a punched Teflon sheet or the like may be noted.

Clean air, which is generated from room air blown by a blower 11 to a filter 12 to be made clean, is supplied into the air distribution container 8 through a duct 13 and a duct opening 14. The clean air current supplied into the air distribution container 8 collide against the projecting structure formed of three panels 15a to 15c provided inside as shown in FIG. 2 to FIG. 4, and get distributed into three directions along the respective panels toward above and both sides. That is, air that hits the panel 15a is guided toward above along this panel, enters the chamber 1 from the air outlet 7a through the air inlet 6a of the chamber 1, and flows along the ceiling. Air that hits the panels 15b and 15c branch to the left and right along the respective panels, enters the chamber 1 via the air outlets 7b and 7c and the air inlets 6b and 6c, and flows along the left and right walls of the chamber 1 as regulated air currents to discharge extra glass particles to the outside of the chamber. The reference numeral 18 denotes burner openings.

The air distribution container 8 is structured as detachable from the chamber 1 and free to advance and retreat by means of rollers 16 along a sliding rail 17, as shown in FIG. 5, so as to facilitate burner exchange, burner position adjustment, etc.

EXAMPLE 1

$SiCl_4$ of 450 ml/min and $GeCl_4$ of 25 ml/min were supplied as material gas to a core deposition burner 3a. $SiCl_4$ of 1.0 l/min and $SiCl_4$ of 3.0 l/min were supplied as material gas to clad deposition burners 3b and 3c, respectively. During the deposition of glass particles, air of 2 $m^3$/min from the blower was supplied into the chamber 1 via the air distribution container 8.

After 36 hours of glass particles deposition under this condition, extra glass particles were discharged to the outside of the chamber as carried on the regulated air currents flowing in the chamber, and no soot was observed on the walls of the chamber. Since the filter 12 set in front of the blower was distanced from the chamber 1, it was kept at the room temperature and was not damaged by heat. Further, no extra glass particles in the chamber 1 adhered to the filter 12.

A glass base material for an optical fiber, which included neither air bubbles nor foreign materials, was obtained from the porous base material 2 manufactured in this manner.

According to the present invention, it is possible to obtain a glass base material for an optical fiber that is excellent in optical properties, and to contribute to reducing the manufacturing cost.

While the embodiment of the present invention has been described, the technical scope of the invention is not limited to the above described embodiment. Various alterations and improvements can be added to the above-described embodiment. It is apparent from the claims that embodiments to which such alterations and improvements are added may also be included in the technical scope of the present invention.

As obvious from the above explanation, according to one embodiment of the present invention, it is possible to realize a manufacturing apparatus for a porous glass base material, which is capable of manufacturing a large-sized porous base material, from which it is possible to obtain an optical fiber base material which allows few air bubbles or foreign materials to mix thereinto when the material is subjected to transparent vitrification.

What is claimed is:

1. A manufacturing apparatus for manufacturing a porous glass base material by depositing glass particles, said manufacturing apparatus comprising:
 a chamber having air inlets; and
 an air distribution container having air outlets from which clean air is supplied to the air inlets,
 wherein the air distribution container has a projecting structure comprising a plurality of surfaces which is formed according to a shape of the air inlets, and distributes the clean air supplied from a duct toward the air outlets by making the clean air collide against the projecting structure,
 wherein the air distribution container is attached on the chamber via a sealing packing, which is provided between the air outlets and the air inlets of the chamber.

2. The manufacturing apparatus for manufacturing the porous glass base material according to claim 1, wherein the chamber and the air distribution container are structured so as to be detachable from each other by a sliding rail and a roller.

3. The manufacturing apparatus for manufacturing the porous glass base material according to claim 1, wherein the air distribution container further is attached on the chamber via a resistance imparting member, which is provided between the air outlets and the air inlets of the chamber.

4. The manufacturing apparatus for manufacturing the porous glass base material according to claim 3, wherein the resistance imparting member has a mesh structure.

5. The manufacturing apparatus for manufacturing the porous glass base material according to claim 4, wherein an amount of air to be supplied to each of the air inlets is adjusted by selecting coarseness of a mesh of the resistance imparting member.

6. The manufacturing apparatus for manufacturing the porous glass base material according to claim 5, wherein the resistance imparting member has a punched structure formed by punching.

7. The manufacturing apparatus for manufacturing the porous glass base material according to claim 6, wherein the amount of air to be supplied to each of the air inlets is adjusted by selecting an interval between, and a size of, punched openings of the punched structure of the resistance imparting member.

8. The manufacturing apparatus for manufacturing the porous glass base material according to claim 1, wherein at least one of the air inlets is located above a plurality of burner openings provided on a wall of the chamber and at least another one of the air inlets is located on a side of the plurality of burner openings.

9. The manufacturing apparatus for manufacturing the porous glass base material according to claim 1, wherein the projecting structure extends throughout an inside area of the air distribution container.

10. The manufacturing apparatus for manufacturing the porous glass base material according to claim 1, wherein one of said surfaces of the projecting structure extends inside the air distribution container in a different angle than another one of said surfaces of the projecting structure.

11. The manufacturing apparatus for manufacturing the porous glass base material according to claim 10, wherein said one of said surfaces of the projecting structure supplies the clean air to one of the air inlets that is placed in a different location than another one of the air inlets that is provided with the clean air from said another one of said surfaces of the projecting structure.

12. The manufacturing apparatus for manufacturing the porous glass base material according to claim 1, wherein said surfaces of the projecting structure comprise:
- a first panel that extends from an inside area of the air distribution container to a ceiling of the air distribution container;
- a second panel that extends from said inside area of the air distribution container to a side wall of the air distribution container; and
- a third panel that extends from said inside area of the air distribution container to another side wall of the air distribution container placed opposite to said side wall of the air distribution container.

13. The manufacturing apparatus for manufacturing the porous glass base material according to claim 12, wherein said chamber comprises a rear wall, said rear wall comprising:
- a first air inlet of said air inlets placed in an upper side of the rear wall;
- a second air inlet of said air inlets placed in a side of the rear wall below the first air inlet; and
- a third air inlet of said air inlets placed in another side of the rear wall below the first air inlet and opposite to the second air inlet.

14. The manufacturing apparatus for manufacturing the porous glass base material according to claim 13, wherein said first, second, and third panels distribute the clean air to a first air outlet, a second air outlet, and a third air outlet of said air outlets, respectively.

15. The manufacturing apparatus for manufacturing the porous glass base material according to claim 12, wherein the clean air is supplied to the chamber exclusively through said first, second, and third panels.

* * * * *